United States Patent
Bachmann et al.

(10) Patent No.: US 7,028,976 B2
(45) Date of Patent: Apr. 18, 2006

(54) CLOSURE ELEMENT, ESPECIALLY A VALVE CONE FOR A CONTINUOUS PRESSURE VALVE

(75) Inventors: Peter Bachmann, Weibersbrunn (DE); Uwe Künzinger, Steinfeld-Waldzell (DE); Holger Mühlhoff, Hösbach (DE); Hans Wölfges, Lohr (DE)

(73) Assignee: Bosch Rexroth AG, Lohr/Main (DE)

( * ) Notice: Subject to any disclaimer, the term of this patent is extended or adjusted under 35 U.S.C. 154(b) by 123 days.

(21) Appl. No.: 10/484,826

(22) PCT Filed: Aug. 7, 2002

(86) PCT No.: PCT/EP02/08801
§ 371 (c)(1),
(2), (4) Date: Jun. 28, 2004

(87) PCT Pub. No.: WO03/014606
PCT Pub. Date: Feb. 20, 2003

(65) Prior Publication Data
US 2004/0238772 A1 Dec. 2, 2004

(30) Foreign Application Priority Data
Aug. 10, 2001 (DE) ................. 101 39 534

(51) Int. Cl.
*F16K 47/00* (2006.01)
(52) U.S. Cl. .............. 251/126; 251/129.07; 251/282; 251/324
(58) Field of Classification Search ......... 251/30.01, 251/43, 120, 126, 129.07, 282, 324, 325
See application file for complete search history.

(56) References Cited

U.S. PATENT DOCUMENTS

| 1,814,443 | A | * | 7/1931 | Goldberg .............. 137/510 |
| 2,303,590 | A | * | 12/1942 | Towler ................ 137/538 |
| 2,550,535 | A | * | 4/1951 | Davis .................. 184/7.4 |
| 3,398,936 | A | * | 8/1968 | Delano .............. 239/533.11 |
| 4,899,699 | A |   | 2/1990 | Huang et al. |
| 4,909,439 | A |   | 3/1990 | Fu |
| 5,072,885 | A |   | 12/1991 | Hans et al. |
| 5,785,257 | A |   | 7/1998 | Furuya et al. |
| 5,934,326 | A | * | 8/1999 | Kawase ................ 137/869 |
| 6,745,992 | B1 | * | 6/2004 | Yang et al. ........... 251/30.03 |
| 6,886,595 | B1 | * | 5/2005 | James et al. .......... 137/625.33 |

FOREIGN PATENT DOCUMENTS

DE    1147450    4/1963

(Continued)

Primary Examiner—Justine R. Yu
Assistant Examiner—Peter deVore
(74) Attorney, Agent, or Firm—Martin A. Farber

(57) ABSTRACT

A closing body is mounted in an axially displaceable manner in a bore of a fluidic valve to control a pressure medium flowing via the valve. The closing body has a sealing section, interacting with a seating edge of valve, and a guide section which serves to guide the valve cone in the bore. The guide section is provided with recesses which allow an overflow of pressure medium between the two sides of the closing body. To reduce costs of production, the guide section of the closing body is of cylindrical form and its surface is provided with at least one helical groove which leads from one side of the guide section to its other side. The closing body is useful in particular in constant pressure valves for controlling fluid pressure medium. The sealing section of the closing body is normally of conical form.

9 Claims, 2 Drawing Sheets

FOREIGN PATENT DOCUMENTS

| | | |
|---|---|---|
| DE | 1550435 | 8/1970 |
| DE | 3308967 | 3/1984 |
| DE | 19907732 | 8/2000 |
| FR | 1291716 | 3/1962 |
| FR | 2156942 | 6/1973 |

* cited by examiner

CLOSURE ELEMENT, ESPECIALLY A VALVE CONE FOR A CONTINUOUS PRESSURE VALVE

FIELD AND BACKGROUND OF THE INVENTION

The invention relates to a closing body, in particular a valve cone for a constant pressure valve, for controlling fluidic pressure medium, having a sealing section and a guide section which allow an overflow of pressure medium between the two sides of the closing body.

Such a closing body formed as a valve cone has been disclosed by DE 199 07 732 A1. The valve cone is mounted in an axially displaceable manner in a bore of a directly actuated hydraulic proportional pressure relief valve. It has a conically formed sealing section and a guide section. The tip of the sealing section interacts with a seating bore. Formed between the outlet opening of the seating bore and the conically formed sealing section is a choke gap which controls the pressure medium flow and the size of which depends on the position of the valve cone. The guide section has two subsections which guide the valve cone and between which a further section of smaller diameter is arranged. The cylindrical subsections serving for the guidance are provided with a plurality of flats which are distributed uniformly over the circumference and which allow an overflow of pressure medium between the two sides of the valve cone. The flats permit a pressure balance between the two sides of the valve cone, so that the same pressure acts on the valve cone from both sides. The starting material or the production of a valve cone having overflow flats in subsections of the guide section is either round material which is provided with flats during the machining or material of square cross section whose edges are rounded during the machining in such a way that the outside diameter of the subsections serving for the guidance corresponds to the inside diameter of the valve cone bore. Both production variants are therefore very costly. When round material is used, the valve cones, on account of the overflow flats, must be set up for individual grinding operations, either in order to subsequently provide the sealing and guide sections, ground in a centerless manner in a preceding operation, with flats in the region of the guide section, or in order to grind the guide section of the valve cone already provided with flats and the sealing section in two separate operations, since simultaneous centerless grinding of guide and sealing sections is not possible on account of the flats. When material of square cross section is used, a turning operation with interrupted cut is necessary in order to produce the rotationally symmetrical regions. In order to produce the valve cone at the sealing section and at the guide section with small coaxiality tolerance, the two sections have to be ground between centers. However, no centering bore for grinding between centers is admissible directly at the contact surface between the valve cone and a plunger interacting with the latter. A peg-shaped extension having a centering bore therefore has to be provided on this side and is to be shortened by the length of the centering bore after the grinding.

The object of the invention is to provide a closing body of the type mentioned at the beginning which can be produced cost-effectively.

SUMMARY OF THE INVENTION

This object is achieved by the shaping according to the invention of the closing body to allow the hardened closing body to be ground in a centerless manner in one operation with small coaxial tolerance without centering bores at sealing and guide sections. Although the grooves interrupt the surface of the closing body, the closing body, on account of the helical arrangement of the grooves, is always guided in the grinding device at the guide section over a sufficient length for the centerless grinding. This means that the closing body can be produced by machining before the hardening and can be finish-ground in a centerless manner with one operation at the sealing section and guide section after the hardening.

Advantageous developments of the invention relate to the number and the arrangement of the helical grooves and to the configuration of the guide section. Further features relate to the production and the use of a valve cone according to the invention.

BRIEF DESCRIPTION OF THE DRAWINGS

The invention is explained in more detail below with reference to exemplary embodiments shown in the drawings, in which.

DETAILED DESCRIPTION OF THE PREFERRED EMBODIMENT

Figure 1:
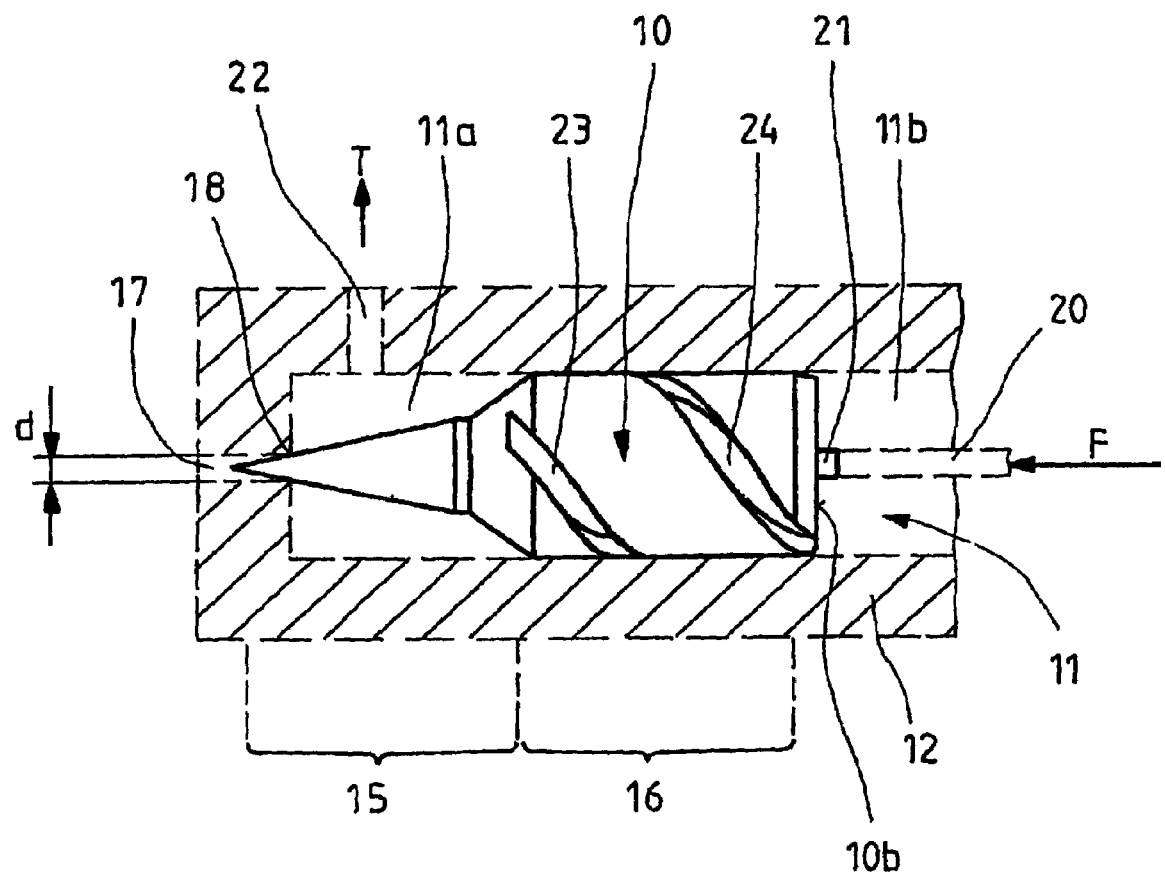
FIG. 1 shows a first closing body according to the invention which is formed as a valve cone and is guided in a bore of a housing of a hydraulic valve.

The same parts are provided with the same reference numerals.

FIG. 1 shows a first closing body configured according to the invention in the form of a valve cone 10 which is guided in a bore 11 of a housing 12 (only schematically shown) of a hydraulic valve. The valve cone 10 subdivides the bore 11 into two regions 11a and 11b. The valve cone 10 has a conically formed sealing section 15 and a cylindrically formed guide section 16. The tip of the conically formed sealing section 15 projects into a bore 17 of the valve 12, via which bore 17 the pressure medium is fed to the valve 12. The outlet opening of the bore 17 is formed as a valve seat 18. A choke gap controlling the pressure medium flow is formed between the valve seat 18 and the conically formed sealing section 15 of the valve cone 10. The size of the choke gap is determined by the distance of the valve cone 10 from the valve seat 18. The pressure medium exerts a force on the valve cone 10 which is equal to the product of the pressure of the pressure medium in the bore 17 and the cross-sectional area of the valve seat 18. The cross-sectional area of the valve seat 18 is determined by the diameter d of the bore 17. The force, designated by F, of an electromagnet (not shown in FIG. 1) acts via a plunger 20 on the opposite side, provided with the reference numeral 10b, of the valve cone 10. The plunger 20 acts on a peg-shaped extension 21 of the valve cone 10, the diameter of this peg-shaped extension 21 being equal to the diameter of the plunger 20. The extension 21 prevents the plunger from working its way into the end face of the valve cone 10. The guidance of the valve cone 10 in the bore 11 would be adversely affected by the plunger 20 working its way into the end face of the valve cone 10. Via a further bore 22, pressure medium is discharged from the region 11a to a tank T (not shown in FIG. 1). The pressure in the region 11a is virtually identical to the tank pressure.

The outside diameter of the guide section 16 and the inside diameter of the bore 11 are matched to one another in such a way that the valve cone 10 can be displaced axially with slight radial play in the bore 11. On its top side, the guide section 16 of the valve cone 10 is provided with two helically formed grooves 23 and 24. The grooves 23 and 24 form passages which connect the two sides of the valve cone 10 to one another. They permit an overflow of pressure medium from the region 11a into the region 11b and in the opposite direction. The grooves 23 and 24 permit a pressure balance between the regions 11a and 11b, so that the same pressure acts on the valve cone 10 in the region 11b as in the region 11a. The grooves 23 and 24 have the same pitch and width. They are offset from one another by 180°. Since the pressure of the pressure medium in the two grooves has the same magnitude, forces which are exerted in the radial direction on the valve body 10 by the pressure medium in the guide section 16 counteract one another. The valve cone 10 is centered in the bore 11 by this measure. The number of helical grooves is not restricted to two. If the guide section of the valve cone 10 is provided with n helical grooves, n being an integral number, the grooves are in each case offset from one another by 360/n°. The result of this measure is that the forces exerted in the radial direction on the valve body 10 by the pressure medium in the guide section 16 counteract one another. The axial position of the valve body 10 is set in such a way that the forces acting on the valve body 10 counteract one another. Since the force acting on the tip of the sealing section 15 is proportional to the pressure in the bore 17, the pressure in the bore 17 is set in accordance with the force F exerted on the valve cone 10 by the electromagnet.

Figure 2:
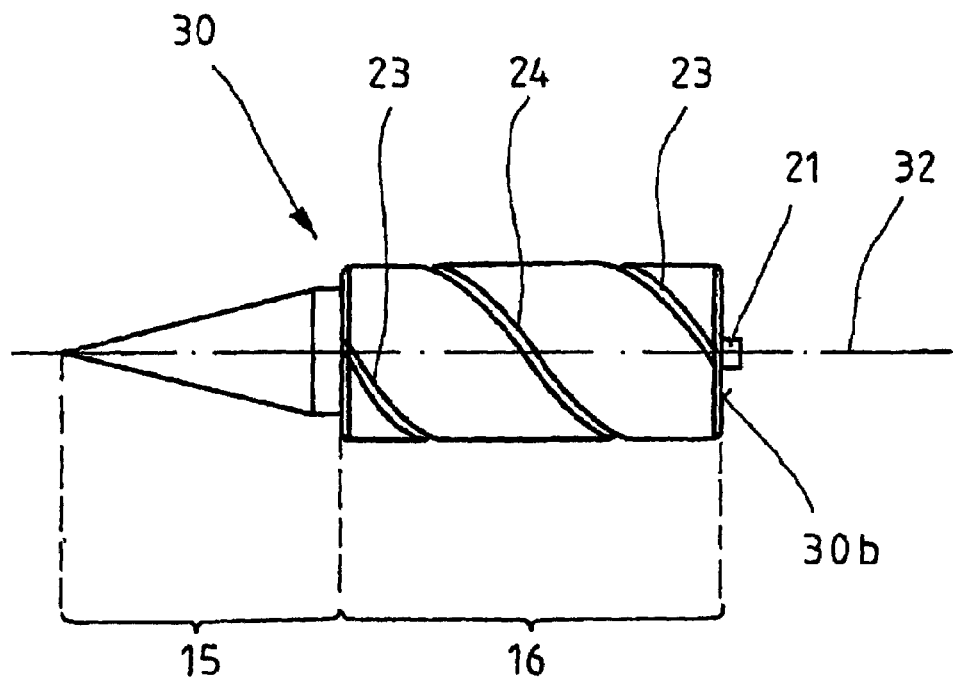
FIG. 2 shows a second closing body according to the invention formed as a valve cone.

FIG. 2 shows a further valve cone 30. As in FIG. 1, the sealing section and the guide section of the valve cone 30 are provided with the reference numerals 15 and 16, respectively. The end face, provided with the peg-shaped extension 21, of the valve cone 30 is designated by 30b. The guide section 16 is provided with two grooves 23 and 24 which run helically from the one side of the guide section 16 to its other side. The grooves are offset from one another by 180°. The pitch of the grooves 23 and 24 is selected in such a way that there is no angular offset relative to the center axis, designated by 32, of the valve cone 30. This means that the start and end of each groove lie on a line which runs in the direction of the center axis 32 of the valve cone 30. This ensures that the sum of those regions of a valve cone which bear against the grinding wheel during the grinding has the same magnitude irrespective of the angular position. This results in constant grinding pressure during the centerless grinding of the valve cone.

Figure 3:
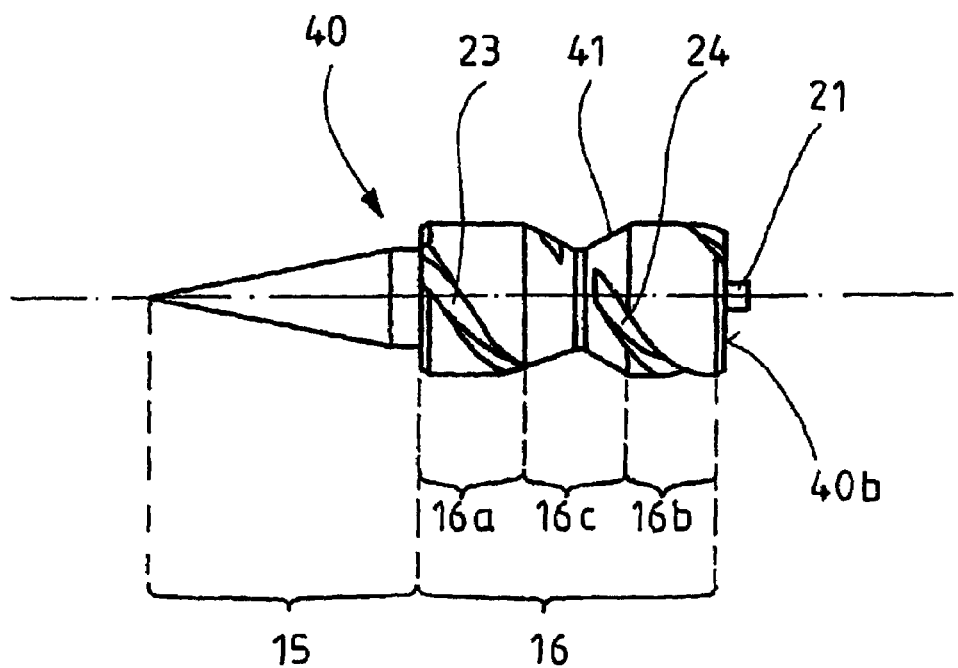
FIG. 3 shows a further closing body according to the invention formed as a valve cone.

FIG. 3 shows a third valve cone 40. The end face, provided with the peg-shaped extension 21, of the valve cone 40 is provided with the reference numeral 40b. As in FIG. 1, the sealing section and the guide section of the valve cone 40 are provided with the reference numerals 15 and 16, respectively. The guide section 16 is subdivided into three subsections 16a, 16b, 16c, of which the subsections 16a and 16b serve to guide the valve cone 40. The subsection 16c is formed as an annular groove 41 of wedge-shaped cross section. The annular groove 41 reduces the areas with which the valve cone 40 touches the inner surface of the bore 11. This measure reduces both the friction forces between the valve cone 40 and the bore 11 and the flow resistance of the grooves 23 and 24.

The closing body according to the invention is produced in the sequence described below:
production of the sealing section 15 and of the guide section 16 and if need be of the interruption 41 in the guide section 16 and of the peg-shaped extension 21 as a turned part from unhardened bar-shaped round material with grinding allowance,
production of the helical grooves 23 and 24 by circular milling in the same setup as for the turning,
hardening,
centerless grinding of the sealing section 15 and of the guide section 16 of the hardened closing body.

The invention facilitates in particular the production of closing bodies made of steel.

We claim:

1. A closing body, suitable as a valve cone for a constant pressure valve for controlling a fluidic pressure medium, the closing body comprising a sealing section and a cylindrical guide section which allow an overflow of pressure medium between two sides of the closing body, wherein the surface of the guide section has at least one helical groove leading from one side of the guide section to its other side, wherein the pitch of a helical groove (23, 24) is selected to avoid an angular offset among a starting point and an ending point of the helical groove (23, 24) relative to a center axis (32) of the closing body (30).

2. The closing body as claimed in claim 1, wherein the guide section (16) has two helical grooves (23, 24) which are offset from one another by 180°.

3. The closing body as claimed in claim 1, wherein the guide section (16) has n helical grooves which are offset from one another by 360/n°, n being an integral number which is greater than two.

4. The closing body as claimed in claim 1, wherein the guide section (16) has an interruption (16c).

5. The closing body as claimed in claim 4, wherein the interruption (16c) of the guide section (16) has the configuration of an annular groove (41).

6. The closing body as claimed in claim 1, further comprising a peg-shaped extension (21) on an end face (10b; 30b; 40b) facing the guide section (16).

7. A method of producing a closing body as claimed in claim 1, comprising the steps of:
producing the sealing section and the guide section;
producing the helical grooves by circular milling,
hardening, the closing body, and
performing a centerless grinding of the closing body.

8. The method as claimed in claim 7, further comprising a step of producing an interruption in the guide section and of a peg-shaped extension as a turned part with grinding allowance.

9. An arrangement of a closing body, as claimed in claim 1, wherein the closing body is disposed in a guide bore (11) of a housing (12) of a constant pressure valve.

* * * * *